United States Patent
Panovic

Patent Number: 5,570,536
Date of Patent: Nov. 5, 1996

[54] FLOAT

[76] Inventor: Rajko Panovic, 4978 Watling Street, Burnaby, B.C., Canada, V5J 1W7

[21] Appl. No.: 363,563

[22] Filed: Dec. 22, 1994

Related U.S. Application Data

[63] Continuation of Ser. No. 233,094, Apr. 25, 1994, abandoned.

[51] Int. Cl.⁶ .................................................. A01K 91/00
[52] U.S. Cl. .................... 43/44.92; 43/44.9; 24/115 K; 24/712.3
[58] Field of Search .................... 43/4.5, 44.87, 43/44.89, 44.9, 44.91, 44.92, 44.95, 44.93, 44.84, 44.83, 44.85; 24/132 R, 115 K, 115 G, 712.1, 712.3

[56] References Cited

U.S. PATENT DOCUMENTS

| | | | |
|---|---|---|---|
| 1,670,185 | 5/1928 | Bond | 43/44.84 |
| 2,293,294 | 8/1942 | Heckman | 43/44.91 |
| 2,395,892 | 3/1946 | Lontz | 43/44.91 |
| 2,498,815 | 2/1950 | McVay | 43/43.11 |
| 2,611,211 | 9/1952 | Stockton | 43/44.91 |
| 2,655,758 | 10/1953 | Warren | 43/44.9 |
| 2,729,015 | 1/1956 | Finnegan | 43/44.9 |
| 2,847,792 | 8/1958 | Kuhlmann | 43/44.9 |
| 2,902,792 | 9/1959 | Friday | 43/44.87 |
| 2,958,153 | 11/1960 | Yerman | 43/44.91 |
| 3,106,003 | 10/1963 | Herdman | 24/712.3 |
| 3,230,659 | 1/1966 | Colling | 43/43.11 |
| 3,800,459 | 4/1974 | Fleischaker | 43/44.9 |
| 3,857,645 | 12/1974 | Klein | 289/1.5 |
| 3,908,238 | 9/1975 | Panicci | 24/712.3 |
| 3,967,407 | 7/1976 | Halbasch | 43/44.9 |
| 4,771,565 | 9/1988 | Shepherd | 43/43.1 |
| 4,893,433 | 1/1990 | Scheffler | 43/43.1 |
| 5,031,351 | 7/1991 | Rogel | 43/44.9 |
| 5,440,831 | 8/1995 | Chandler | 43/44.92 |

FOREIGN PATENT DOCUMENTS

| | | | |
|---|---|---|---|
| 1259964 | 3/1961 | France | 43/44.95 |
| 0021395 | 4/1911 | Norway | 43/43.11 |
| 0170624 | 3/1960 | Sweden | 43/44.87 |

*Primary Examiner*—Jack W. Lavinder
*Assistant Examiner*—James Miner

[57] ABSTRACT

A float for a line for a fishing net. The line has a buoyant body with openings at each end to receive the line. The buoyant body is formed in two parts and defines a cavity within the body to receive a knot in the line.

4 Claims, 1 Drawing Sheet

FLOAT

CROSS-REFERENCE TO RELATED APPLICATION

This is a continuation of application Ser. No. 08/233,094 filed Apr. 25, 1994 now abandoned.

FIELD OF THE INVENTION

This invention relates to a float.

DESCRIPTION OF THE PRIOR ART

In commercial fishing the nets used are huge. They are suspended from extremely long lines attached to the fishing boat. The nets and the lines are payed out from rollers and drawn in by rotation of the rollers to draw in the line and the net.

The net is located by the provision of floats on the line. These floats are generally ellipsoid, typically of a foamed plastic, for example polyurethane. They are of one-piece construction with a central channel to receive the line and are positioned by being moved along the line. There are usually reinforcing portions at each end of the channel to avoid the line abrading the foam.

The lines used in a modern fishing vessel are of great length. It is therefore frequently necessary to knot lengths of line together to produce the requisite length. Furthermore breaks occur and must be repaired with knots.

Knots are a nuisance to the fishermen. They interfere with the smooth operation of the rollers, they become entangled in the net and they tear the net.

SUMMARY OF THE INVENTION

The present invention seeks to avoid the problems of knots in the fishing line by covering the knots.

Accordingly, the present invention is a float for a line for a fishing net comprising a buoyant body having openings at each end to receive the line; said buoyant body being formed in two parts and defining a cavity within the body to receive a knot in the line.

The two body parts may be glued together or may be temporarily attached by at least one circumferential band. Desirably there are external channels, for example two channels, on the body to receive the circumferential bands. The bands may be simple strings, knotted around the cover but, for preference, will be a nylon strap having a non-reversible lock at one end. The straps are strong. The locks are small and can be sunk within a circumferential channel.

DESCRIPTION OF THE PREFERRED EMBODIMENTS

Figure 1:
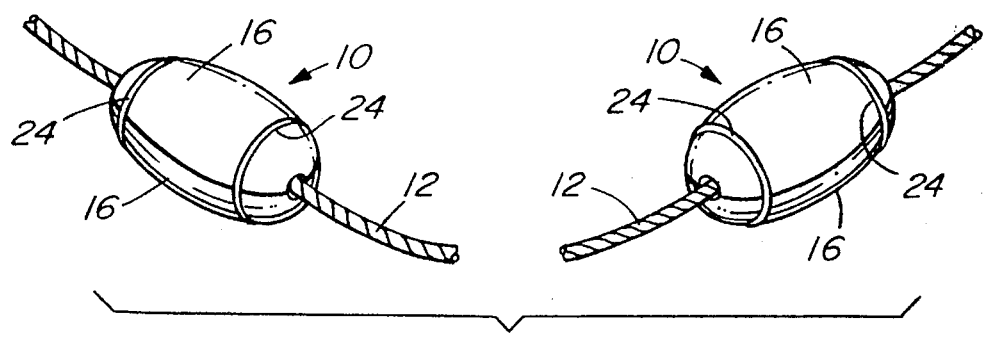
FIG. 1 illustrates two floats according to the present invention in position on a line.
Figure 2:
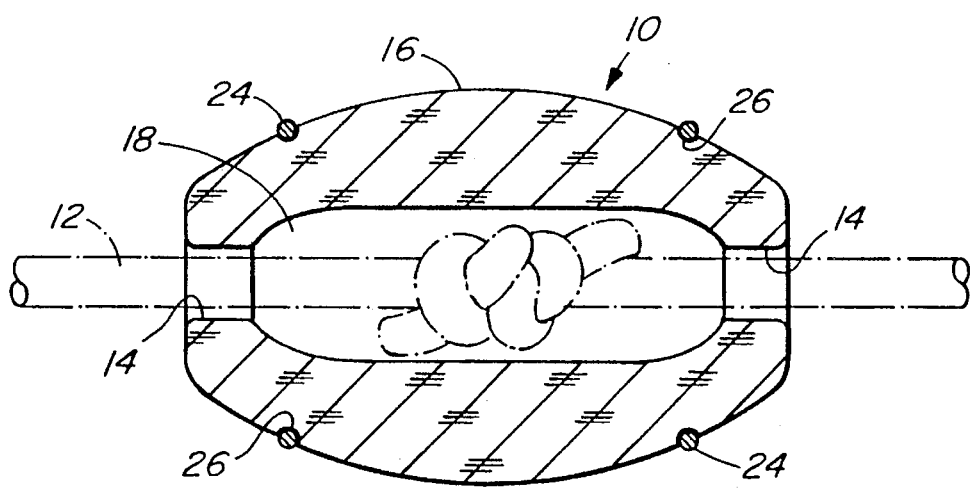
FIG. 2 is a section through a float according to the present invention.

FIG. 1 shows two floats 10 according to the present invention mounted on a line 12. As shown particularly in FIG. 2 the float acts as a knot cover. The float 10 has openings 14 at each end to receive the line 12. The float 10 is formed in two parts 16. The two parts 16 are hollowed out so that the float has an internal cavity 18 to receive a knot 20 in the line as shown in FIG. 2.

Figure 3:
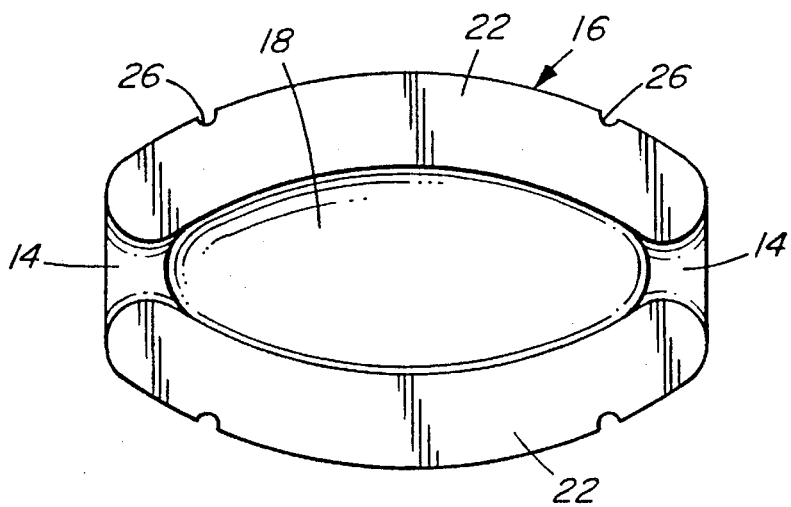
FIG. 3 illustrates one part of a float according to the present invention.

The two parts 16 may be glued together by applying glue to the surfaces 22 shown in FIG. 3. In this regard hot melt adhesive, for example polyethylene, has proved useful. Alternatively the two parts may be temporarily attached by circumferential bands 24 as shown in FIGS. 1 and 2. To this end the body parts 16 are formed with circumferential channels 26 to receive the bands 24. As shown in FIG. 1 two bands 24 are preferred.

The float 10 may be made of material conventional in the art, for example foamed polyurethane. As is also conventional the openings 14 may be reinforced, for example with a plastic coat, to resist abrasion by the line 12.

The present invention thus provides a solution to the problem of knots in a fishing line. The float 10 is precisely the same externally as a conventional float and functions as well as a conventional float with, possibly, slightly less buoyancy due to there being slightly less volume of foam. However, the effect is negligible. As with conventional floats the float of the present invention does not impede the drawing in or paying out of the net. It does not become entangled with the line and does not tear the net. Furthermore the invention permits the use of relatively short pieces of line as it avoids the disadvantages of uncovered knots.

Although the forgoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

I claim:

1. A method of covering a knot in a fishing line that comprises:

locating the knot in the line within a float, said float comprising a buoyant body comprising two ends, said buoyant body being open at both ends to receive the line, said buoyant body being formed in two parts and defining a cavity within the body large enough to receive the knot in the line, the cavity being restricted at each end to prevent the float moving on the fishing line past the knot; and attaching the two parts of said buoyant body together by gluing to cover the knot.

2. A method of covering a knot in a fishing line that comprises:

locating the knot in the line within a float, said float comprising a buoyant body comprising two ends, said buoyant body being open at both ends to receive the line, said buoyant body being formed in two parts and defining a cavity within the body large enough to receive the knot in the line, the cavity being restricted at each end to prevent the float moving on the fishing line past the knot; and attaching the two parts of said buoyant body together by at least one circumferential band.

3. A method as claimed in claim 2 in which there is at least one external channel in the body to receive the at least one circumferential band.

4. A method as claimed in claim 3 in which there are two bands and two channels.

* * * * *